United States Patent
Chao et al.

(10) Patent No.: US 11,467,968 B2
(45) Date of Patent: Oct. 11, 2022

(54) MEMORY-ADAPTIVE PROCESSING METHOD FOR CONVOLUTIONAL NEURAL NETWORK

(71) Applicant: NEUCHIPS CORPORATION, Hsinchu (TW)

(72) Inventors: Ping Chao, Taipei (TW); Chao-Yang Kao, Hsinchu (TW); Youn-Long Lin, Zhubei (TW)

(73) Assignee: NEUCHIPS CORPORATION, Hsinchu (TW)

( * ) Notice: Subject to any disclaimer, the term of this patent is extended or adjusted under 35 U.S.C. 154(b) by 112 days.

(21) Appl. No.: 17/186,105

(22) Filed: Feb. 26, 2021

(65) Prior Publication Data
US 2021/0182204 A1 Jun. 17, 2021

Related U.S. Application Data

(62) Division of application No. 16/533,872, filed on Aug. 7, 2019, now Pat. No. 10,963,390.

(60) Provisional application No. 62/720,249, filed on Aug. 21, 2018.

(51) Int. Cl.
| | |
|---|---|
| *G06F 12/0873* | (2016.01) |
| *G06N 3/04* | (2006.01) |
| *G06N 3/08* | (2006.01) |
| *G06F 9/38* | (2018.01) |

(52) U.S. Cl.
CPC .......... *G06F 12/0873* (2013.01); *G06F 9/381* (2013.01); *G06N 3/04* (2013.01); *G06N 3/08* (2013.01); *G06F 2212/305* (2013.01); *G06F 2212/608* (2013.01)

(58) Field of Classification Search
CPC ......... G06F 12/0873; G06N 3/04; G06N 3/08
See application file for complete search history.

(56) References Cited

U.S. PATENT DOCUMENTS

| | | | |
|---|---|---|---|
| 10,417,555 B2* | 9/2019 | Brothers | .................. G06N 3/10 |
| 2019/0243755 A1* | 8/2019 | Luo | ........................ G06N 3/08 |
| 2020/0019851 A1* | 1/2020 | Mehrabian | ............. G06N 3/067 |
| 2020/0174686 A1* | 6/2020 | Song | .................... G06F 3/0604 |

* cited by examiner

*Primary Examiner* — David E Martinez
(74) *Attorney, Agent, or Firm* — McClure, Qualey & Rodack, LLP (57) ABSTRACT

A memory-adaptive processing method for a convolutional neural network includes a feature map counting step, a size relation counting step and a convolution calculating step. The feature map counting step is for counting a number of a plurality of input channels of a plurality of input feature maps, an input feature map tile size, a number of a plurality of output channels of a plurality of output feature maps and an output feature map tile size for a convolutional layer operation. The size relation counting step is for obtaining a cache free space size in a feature map cache and counting a size relation. The convolution calculating step is for performing the convolutional layer operation with the input feature maps to produce the output feature maps according to a memory-adaptive processing technique, and the memory-adaptive processing technique includes a dividing step and an output-group-first processing step.

6 Claims, 14 Drawing Sheets

|  | | | | | | | | | | | | | | | | | | | | | |
|---|---|---|---|---|---|---|---|---|---|---|---|---|---|---|---|---|---|---|---|---|---|
| Input | Map 0 | R | | | | | | | | | | | | | | | | | | | |
| | Map 1 | | R | R | R | R | R | R | R | R | R | R | R | R | | | | | | | |
| | Map 2 | | | | | | | R | | | R | | | R | | | R | | | R | |
| | Map 3 | | | | | | | | | | | | | | | | | | | | R |
| Output | Map 0 | | w | rw | rw | w | rw | rw | w | rw | rw | w | | | | | | | | | |
| | Map 1 | | | rw | rw | rw | rw | rw | rw | rw | rw | rw | rw | | | | | | | | |
| | Map 2 | | | | rW | | | rW | | | rW | | | rW | | | rW | | | | |
| | Map 3 | | | | | | | | | | | | | | | | | rW | rW | rW | rW |

|  | Map 0 | Map 1 | Map 0 | Map 1 | Map 2 | Map 3 | Map 4 | Map 5 | Map 6 | Map 7 |
|---|---|---|---|---|---|---|---|---|---|---|
|  | R | r | w |  |  |  |  |  |  |  |
|  | r | r |  | W |  |  |  |  |  |  |
|  | r | r |  |  | W |  |  |  |  |  |
|  | r | r |  |  |  | W |  |  |  |  |
|  | r | r |  |  |  |  | W |  |  |  |
|  | r | r |  |  |  |  |  | W |  |  |
|  | r | r |  |  |  |  |  |  | W |  |
|  | r | r |  |  |  |  |  |  |  | W |
|  | R | r |  | RW |  |  |  |  |  |  |
|  | r | r |  |  | RW |  |  |  |  |  |
|  | r | r |  |  |  | RW |  |  |  |  |
|  | r | r |  |  |  |  | RW |  |  |  |
|  | r | r |  |  |  |  |  | RW |  |  |
|  | r | r |  |  |  |  |  |  | RW |  |
|  | r | r |  |  |  |  |  |  |  | RW |

MEMORY-ADAPTIVE PROCESSING METHOD FOR CONVOLUTIONAL NEURAL NETWORK

RELATED APPLICATIONS

The present application is a Divisional Application of the U.S. application Ser. No. 16/533,872, filed Aug. 7, 2019, which claims priority to U.S. Provisional Application Ser. No. 62/720,249, filed Aug. 21, 2018, all of which are herein incorporated by reference.

BACKGROUND

Technical Field

The present disclosure relates to a processing method for a convolutional neural network. More particularly, the present disclosure relates to a memory-adaptive processing method for a convolutional neural network.

Description of Related Art

A convolutional neural network (CNN) refers to a trained multilayer neural network structure in which one or more convolution operations are implemented. For example, deep learning-based image and voice recognition may be implemented through a trained CNN. The convolutional neural network is widely used in various applications, especially in image and video applications. The convolution layer is an essential computation part in the convolutional neural network.

Power consumption is the most important issue for the convolutional neural network computing on edge devices. Furthermore, dynamic random access memory (DRAM) access can consume most of the power in a system, and how to optimize DRAM access to reduce power consumption is a crucial problem for edge AI computing. Therefore, a memory-adaptive processing method for the convolutional neural network and a system thereof which are capable of reducing DRAM access are commercially desirable.

SUMMARY

According to one aspect of the present disclosure, a memory-adaptive processing method for a convolutional neural network includes a feature map counting step, a size relation counting step and a convolution calculating step. The feature map counting step is for counting a number of a plurality of input channels of a plurality of input feature maps, an input feature map tile size, a number of a plurality of output channels of a plurality of output feature maps and an output feature map tile size for a convolutional layer operation of the convolutional neural network. The size relation counting step is for obtaining a cache free space size in a feature map cache and counting a size relation among the number of the input channels of the input feature maps, the number of the output channels of the output feature maps, the input feature map tile size, the output feature map tile size and the cache free space size of the feature map cache. The convolution calculating step is for performing the convolutional layer operation with the input feature maps to produce the output feature maps according to a memory-adaptive processing technique. The memory-adaptive processing technique includes a dividing step and an output-group-first processing step. The dividing step is for dividing the output channels into a plurality of output groups according to the size relation. The output-group-first processing step includes a plurality of input-layer-first processing steps, and each of the input-layer-first processing steps are performed corresponding to each of the output groups, respectively.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below.

However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
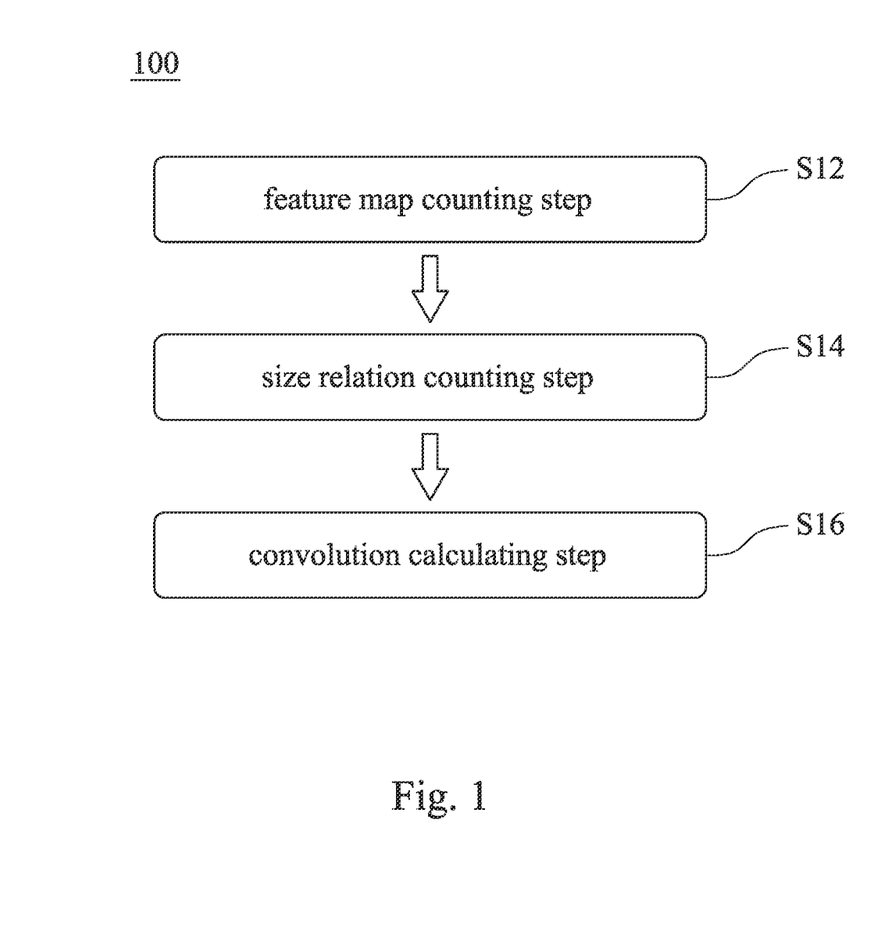
FIG. 1 shows a flow chart of a memory-adaptive processing method for a convolutional neural network according to a first embodiment of the present disclosure.
Figure 2:
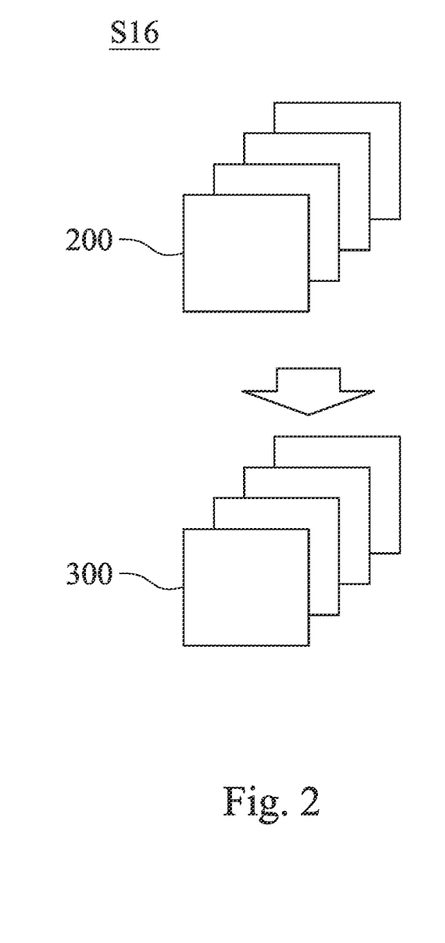
FIG. 2 shows a schematic view of a convolution calculating step of the memory-adaptive processing method for the convolutional neural network of FIG. 1.
Figure 3:
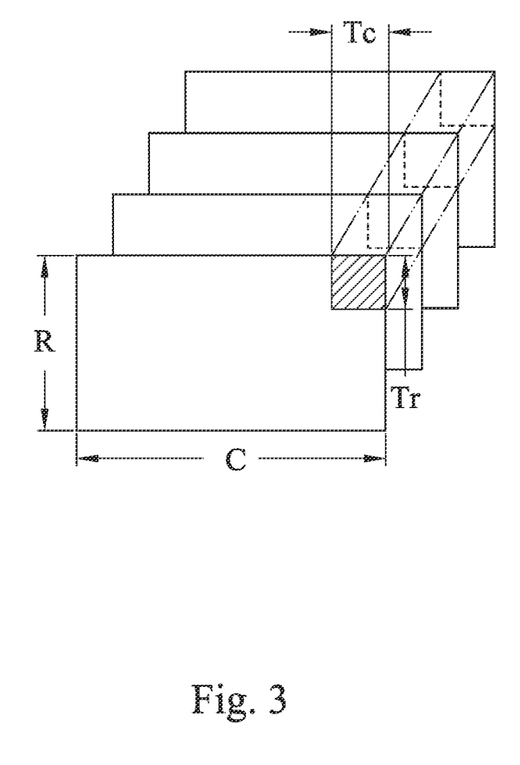
FIG. 3 shows a schematic view of an input feature map tile size of a processing loop structure in a feature map.
Figure 4:
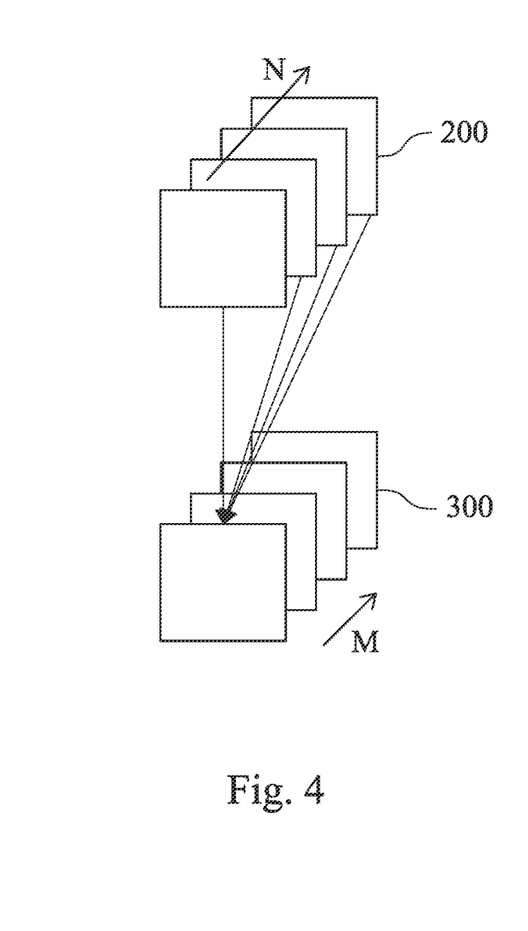
FIG. 4 shows a schematic view of an output-layer-first processing of the processing loop structure.
Figure 5:
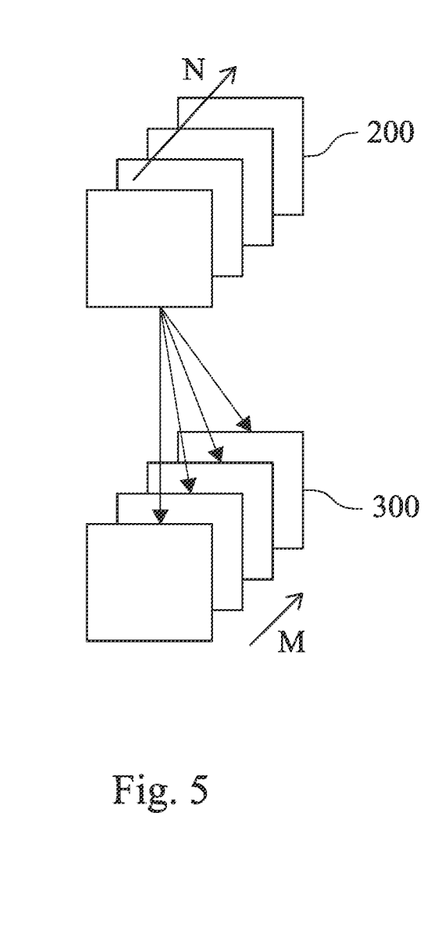
FIG. 5 shows a schematic view of an input-layer-first processing of the processing loop structure.

FIG. 1 shows a flow chart of a memory-adaptive processing method 100 for a convolutional neural network according to a first embodiment of the present disclosure. FIG. 2 shows a schematic view of a convolution calculating step S16 of the memory-adaptive processing method 100 for the convolutional neural network of FIG. 1. FIG. 3 shows a schematic view of an input feature map tile size of a processing loop structure in a feature map. FIG. 4 shows a schematic view of an output-layer-first processing of the processing loop structure. FIG. 5 shows a schematic view of an input-layer-first processing of the processing loop structure. The memory-adaptive processing method 100 for the convolutional neural network includes a feature map counting step S12, a size relation counting step S14 and a convolution calculating step S16.

The feature map counting step S12 is for counting a number N of a plurality of input channels of a plurality of input feature maps, an input feature map tile size, a number M of a plurality of output channels of a plurality of output feature maps and an output feature map tile size for a convolutional layer operation of the convolutional neural network.

The size relation counting step S14 is for obtaining a cache free space size (CFS) in a feature map cache and counting a size relation among the number N of the input channels of the input feature maps, the number M of the output channels of the output feature maps, the input feature map tile size, the output feature map tile size and the cache free space size of the feature map cache. The cache free space size represents a size of an available space in the feature map cache. The cache free space size is dynamically calculated, i.e., the available space in the feature map cache is calculated after a feature map cache flush or insertion. In addition, the cache free space size may be calculated in one of the three ways: 1. The cache free space size simply equals to the total cache size, 2. The cache free space size equals to the available cache space allocated for the convolutional neural network processing process, and 3. The cache free space size equals to the available cache space size minus an reserved space size for some other tensors.

The convolution calculating step S16 is for performing the convolutional layer operation with the input feature maps to produce the output feature maps according to a memory-adaptive processing technique, and the memory-adaptive processing technique includes a transformation of a processing loop structure for the convolutional layer operation according to the size relation. The convolutional layer operation represents a convolution calculation and an activation function of each of the convolutional layers. The convolutional layer operation may also include a batch normalization or a concatenation operation. Table 1 lists one example of the processing loop structure for the convolutional layer operation of FIG. 2. In the processing loop structure, a feature map (e.g., one of the input feature map and the output feature map) can be divided into a plurality of tiles, as shown in FIG. 3. In another embodiment, the feature map can be a tile. R represents total rows of the feature map, and C represents total columns of the feature map. Tr represents tile rows of one of the tiles, and Tc represents tile columns of one of the tiles. N represents the number of the input channels of the input feature maps, and M represents the number of the output channels of the output feature maps.

TABLE 1

```
// processing loop structure
// output-layer-first processing
for (row = 0; row < R; row += Tr) {    //first loop
    for (col = 0; col < C; col += Tc) {    //second loop
        for (to = 0; to < M; to += 1) {    //third loop
            for (ti = 0; ti < N; ti += 1) {    //fourth loop
                single tiling processing iteration;
} } } }
```

In one embodiment, the transformation of the processing loop structure includes changing the input feature map tile size (Tr×Tc) of the processing loop structure for a single tiling processing iteration according to the size relation. The input feature map tile size (Tr×Tc) is equal to Tr multiplied by Tc, so that the input feature map tile size is determined according to a first loop and a second loop of the processing loop structure. In other words, the first loop and the second loop are configured to execute the convolutional calculation for each of the tiles. There are (R/Tr)×(C/Tc) iterations to process all the tiles. In addition, when the input feature map tile size (Tr×Tc) is smaller than the cache free space size divided by a sum of the number N of the input channels of the input feature maps and the number M of the output channels of the output feature maps, the accesses to the feature map data stored in an external memory (e.g., a dynamic random access memory 410 in FIG. 11) for the processing of the whole layer can be minimized.

In another embodiment, the transformation of the processing loop structure includes transforming the processing loop structure between an input-layer-first processing and an output-layer-first processing. The processing loop structure may be the input-layer-first processing or the output-layer-first processing according to a third loop and a fourth loop of the processing loop structure. In Table 1, the third loop and the fourth loop of the processing loop structure are corresponding to the output-layer-first processing. The output-layer-first processing represents that there is at least one of the input channels of an input feature map tile 200 in the feature map cache, and there is only one of the output channels of an output feature map tile 300 in the feature map cache. The input feature map tile 200 represents one tile of the input feature maps. The output feature map tile 300 represents one tile of the output feature maps. The convolutional layer operation is performed in the processing loop structure with the output feature maps computing iterations as an outer loop (i.e., the third loop in Table 1) and the input feature maps computing iterations as an inner loop (i.e., the fourth loop in Table 1).

Table 2 lists another example of the processing loop structure for the convolutional layer operation of FIG. 2. In Table 2, the third loop and the fourth loop of the processing loop structure are corresponding to the input-layer-first processing. The input-layer-first processing represents that there is only one of the input channels of the input feature map tile 200 in the feature map cache, and there is at least one of the output channels of the output feature map tile 300 in the feature map cache. The convolutional layer operation is performed in the processing loop structure with the input feature maps computing iterations as an outer loop (i.e., the third loop in Table 2) and the output feature maps computing iterations as an inner loop (i.e., the fourth loop in Table 2).

In further another embodiment, each of the input channels of the input feature map tile 200 has an input feature map tile size Si=Tr×Tc. Each of the output channels of the output feature map tile 300 has an output feature map tile size So=(Tr−kh)×(Tc−kw), where kh and kw are the height and the width of a convolutional kernel divided by two. The number N of the input channels of the input feature maps is multiplied by the input feature map tile size Si to generate a total input size. The number M of the output channels of the output feature maps is multiplied by the output feature map tile size So to generate a total output size, and one of the total input size and the total output size is smaller than the cache free space size (CFS) of the feature map cache. When the total input size (N×Si) is smaller than the cache free space size (CFS) of the feature map cache, all the input channels of the input feature map tile 200 are stored in the feature map cache. When the total output size (M×So) is smaller than the cache free space size of the feature map cache (CFS), all the output channels of the output feature map tile 300 are stored in the feature map cache. Accordingly, the memory-adaptive processing method 100 for the convolutional neural network of the present disclosure utilizes the memory-adaptive processing technique to adaptively change the processing loop structure for the convolutional layer operation according to the size relation among the number N of the input channels of the input feature maps, the number M of the output channels of the output feature maps, the input feature map tile size, the output feature map tile size and the cache free space size of the feature map cache.

TABLE 2

```
// processing loop structure
// input-layer-first processing
for (row = 0; row < R; row += Tr) {    //first loop
    for (col = 0; col < C; col += Tc) {    //second loop
        for (ti = 0; ti < N; ti += 1) {    //third loop
            for (to = 0; to < M; to += 1) {    //fourth loop
                single tiling processing iteration;
} } } }
```

Figure 6:
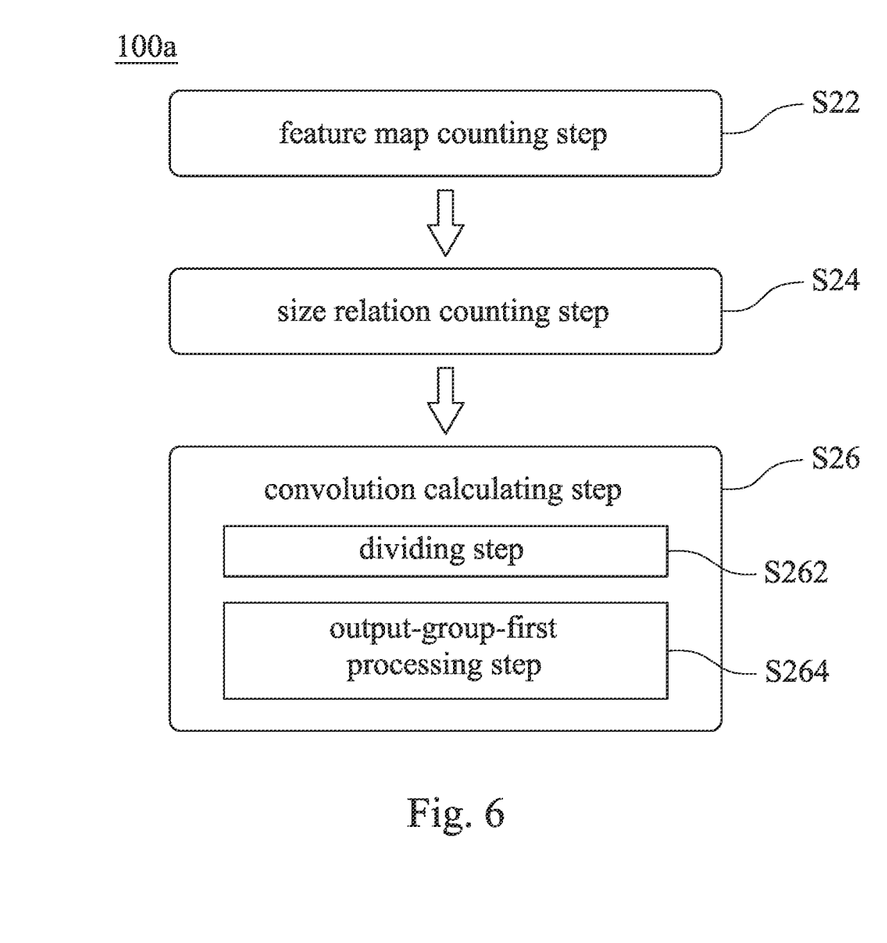
FIG. 6 shows a flow chart of a memory-adaptive processing method for a convolutional neural network according to a second embodiment of the present disclosure.
Figure 7:
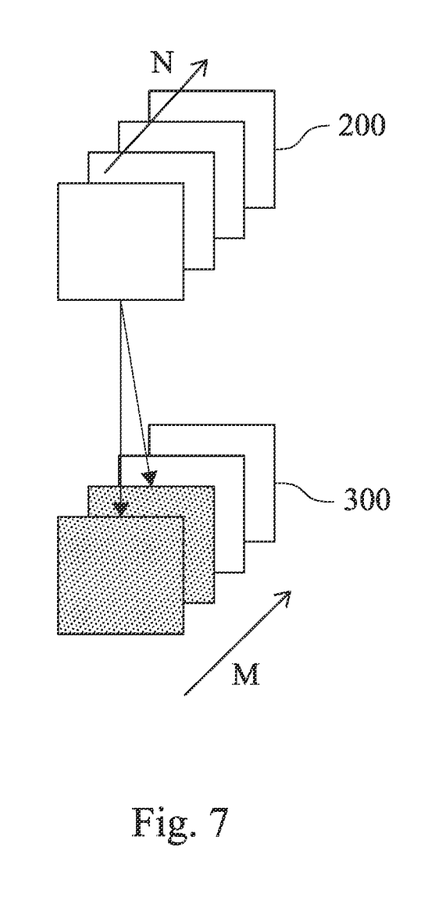
FIG. 7 shows a schematic view of an output-group-first processing step of a convolution calculating step of the memory-adaptive processing method of FIG. 6.

FIG. 6 shows a flow chart of a memory-adaptive processing method 100a for a convolutional neural network according to a second embodiment of the present disclosure. FIG. 7 shows a schematic view of an output-group-first processing step S264 of a convolution calculating step S26 of the memory-adaptive processing method 100a of FIG. 6. The memory-adaptive processing method 100a for the convolutional neural network includes a feature map counting step S22, a size relation counting step S24 and a convolution calculating step S26.

The feature map counting step S22 is for counting a number N of a plurality of input channels of a plurality of input feature maps, an input feature map tile size, a number M of a plurality of output channels of a plurality of output feature maps and an output feature map tile size for a convolutional layer operation of the convolutional neural network.

The size relation counting step S24 is for obtaining a cache free space size in a feature map cache and counting a size relation among the number N of the input channels of the input feature maps, the number M of the output channels of the output feature maps, the input feature map tile size, the output feature map tile size and the cache free space size of the feature map cache.

The convolution calculating step S26 is for performing the convolutional layer operation with the input feature maps to produce the output feature maps according to a memory-adaptive processing technique. The memory-adaptive processing technique includes a dividing step S262 and an output-group-first processing step S264. The dividing step S262 is for dividing the output channels into a plurality of output groups according to the size relation. The output-group-first processing step S264 includes a plurality of input-layer-first processing steps, and each of the input-layer-first processing steps is performed corresponding to each of the output groups. In detail, each of the input-layer-first processing steps is for performing an input-layer-first processing. The input-layer-first processing represents that there is only one of the input channels of the input feature map tile 200 in the feature map cache, and there is at least one of the output channels of the output feature map tile 300 of each of the output groups in the feature map cache. The convolutional layer operation is performed in the processing loop structure with the input feature map tile 200 computing iterations as an outer loop and the output feature map tile 300 of each of the output groups computing iterations as an inner loop.

In the convolution calculating step S26, each of the input channels of the input feature map tile 200 has an input feature map tile size Si=Tr×Tc. Each of the output channels of the output feature map tile 300 has an output feature map tile size So=(Tr−kh)×(Tc−kw), where kh and kw are the height and the width of a convolutional kernel divided by two. The number N of the input channels of the input feature maps is multiplied by the input feature map tile size Si to generate a total input size. The number M of the output channels of the output feature maps is multiplied by the output feature map tile size So to generate a total output size. The total input size and the total output size are both greater than the cache free space size of the feature map cache.

Figure 8:
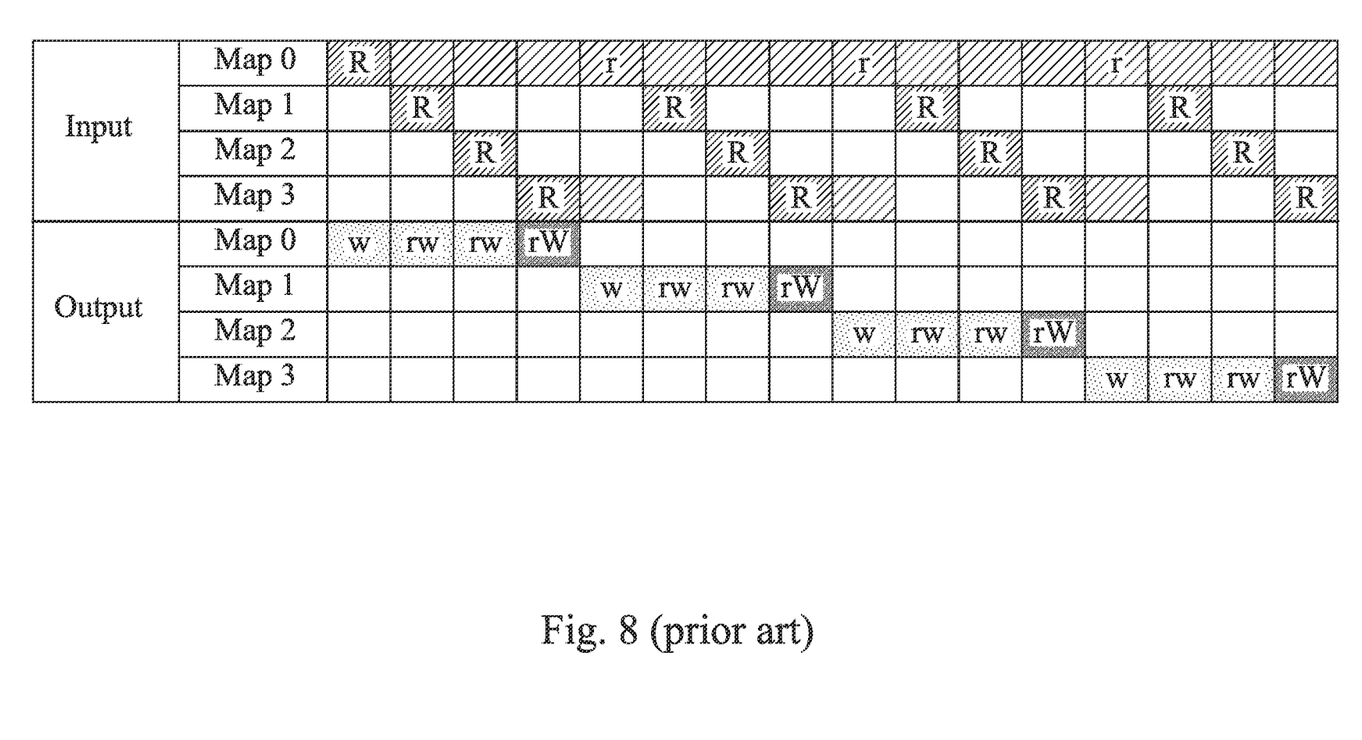
FIG. 8 shows a schematic view of read and write access of a dynamic random access memory (DRAM) and a feature map cache in a first conventional processing method for the convolutional neural network.
Figure 9:
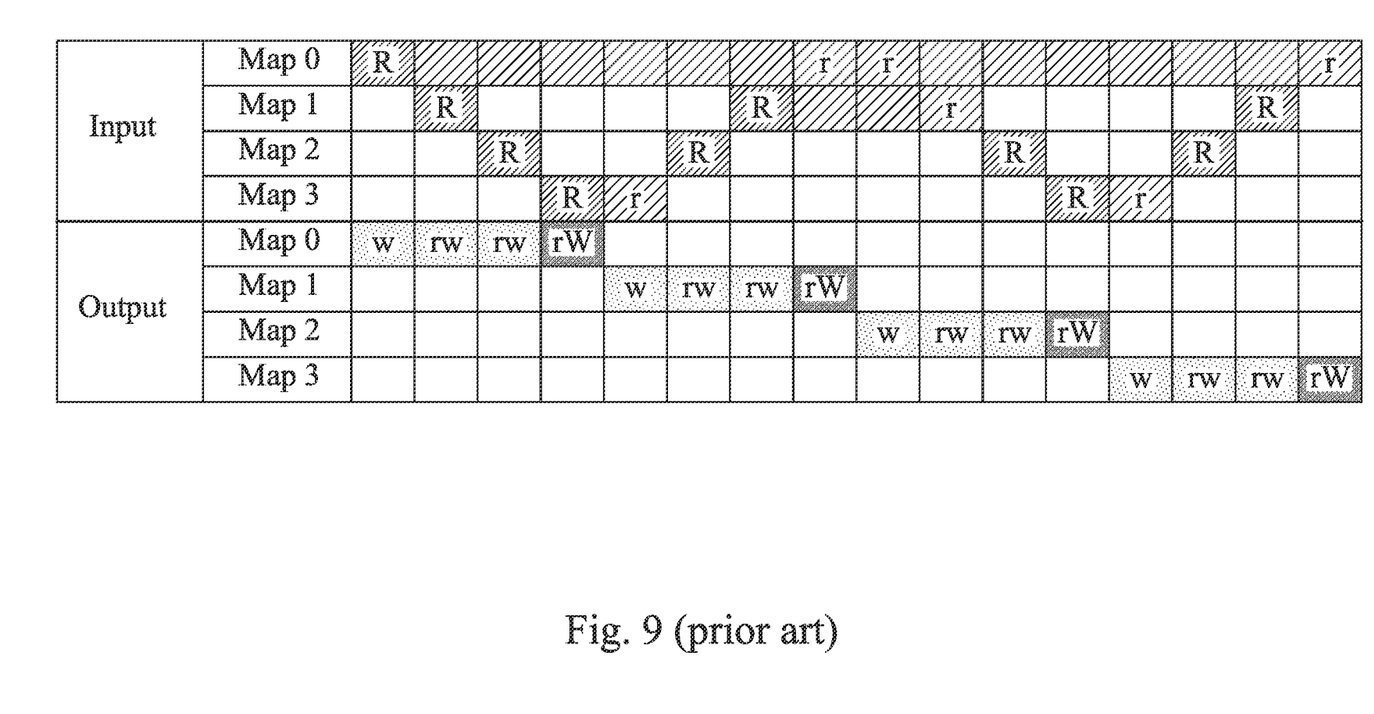
FIG. 9 shows a schematic view of read and write access of the DRAM and the feature map cache in a second conventional processing method for the convolutional neural network.
Figure 10:
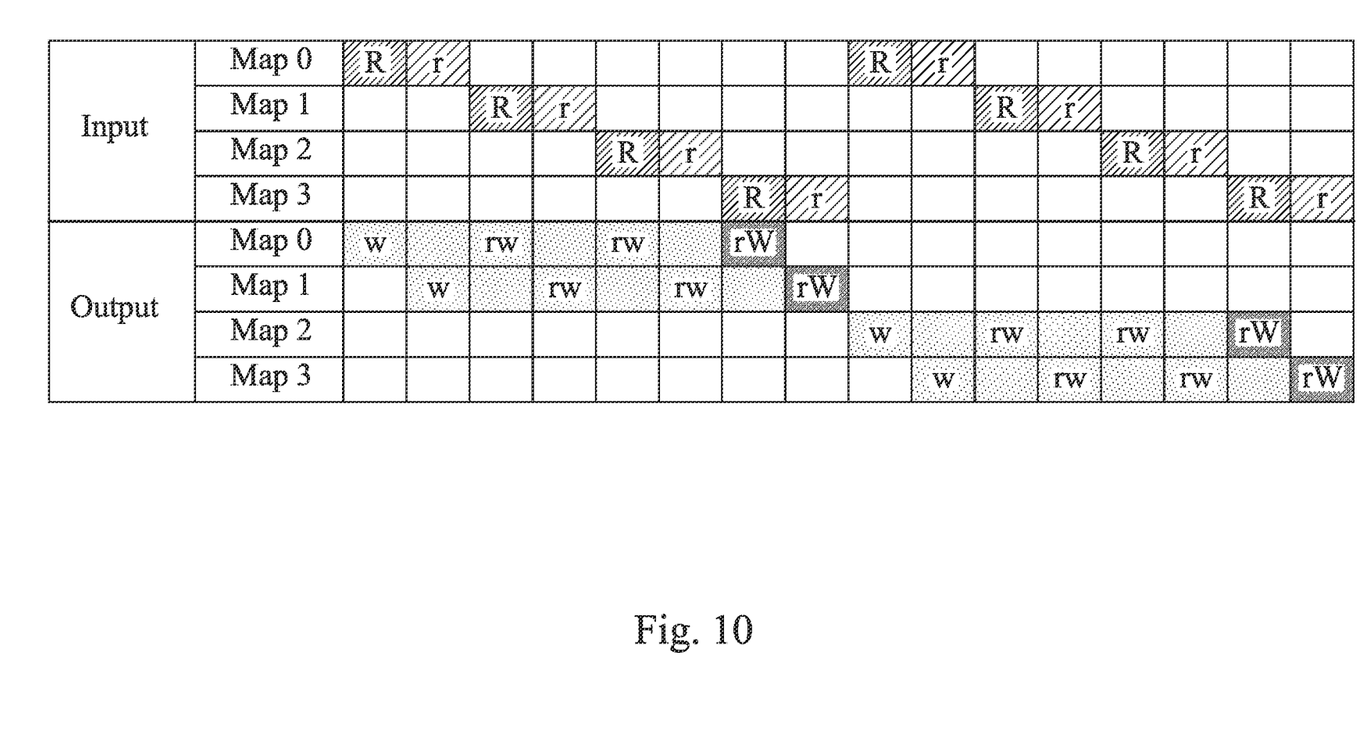
FIG. 10 shows a schematic view of read and write access of the DRAM and the feature map cache in the memory-adaptive processing method of FIG. 6.

FIG. 8 shows a schematic view of read and write access of a dynamic random access memory (DRAM) and a feature map cache in a first conventional processing method for the convolutional neural network. FIG. 9 shows a schematic view of read and write access of the DRAM and the feature map cache in a second conventional processing method for the convolutional neural network. FIG. 10 shows a schematic view of read and write access of the DRAM and the feature map cache in the memory-adaptive processing method 100a of FIG. 6. In FIGS. 8, 9 and 10, the capacity of the feature map cache is three feature map tiles, and there are four input channels (Input Map 0-3) and four output channels (Output Map 0-3) to process (i.e., N=4, M=4). R and W represent read access and write access of the DRAM, respectively. r and w represent read access and write access of the feature map cache, respectively. In FIG. 8, there are 13R and 4W with the DRAM in the first conventional processing method. In FIG. 9, there are 10R and 4W with the DRAM in the first conventional processing method. In FIG. 10, there are 8R and 4W with the DRAM in the memory-adaptive processing method 100a of the present disclosure. Therefore, the memory-adaptive processing method 100a of the present disclosure can reduce DRAM access so as to reduce power consumption.

In another embodiment of the present disclosure, the number of the output channels of the output feature maps is represented as M, and the cache free space size (in unit of the tile size) of the feature map cache is represented as CFS. A number of the output groups is represented as G and described as follows:

$$G = M/(CFS-1) \qquad (1).$$

In further another embodiment of the present disclosure, the number of the input channels of the input feature maps is represented as N, the number of the output channels of the output feature maps is represented as M, the cache free space size of the feature map cache is represented as CFS, and a number of the output groups is represented as G and described as follows:

$$G=M/(CFS-n), n<N, n<CFS \qquad (2).$$

Wherein n represents a positive integer.

In still further another embodiment of the present disclosure, the number of the output channels of the output feature maps is represented as M, the cache free space size of the feature map cache is represented as CFS, and a number of the output groups is represented as G and described as follows:

$$G=M/CFS+n, 0<n\leq M-M/CFS \qquad (3).$$

Wherein n represents a positive integer.

Figure 11:
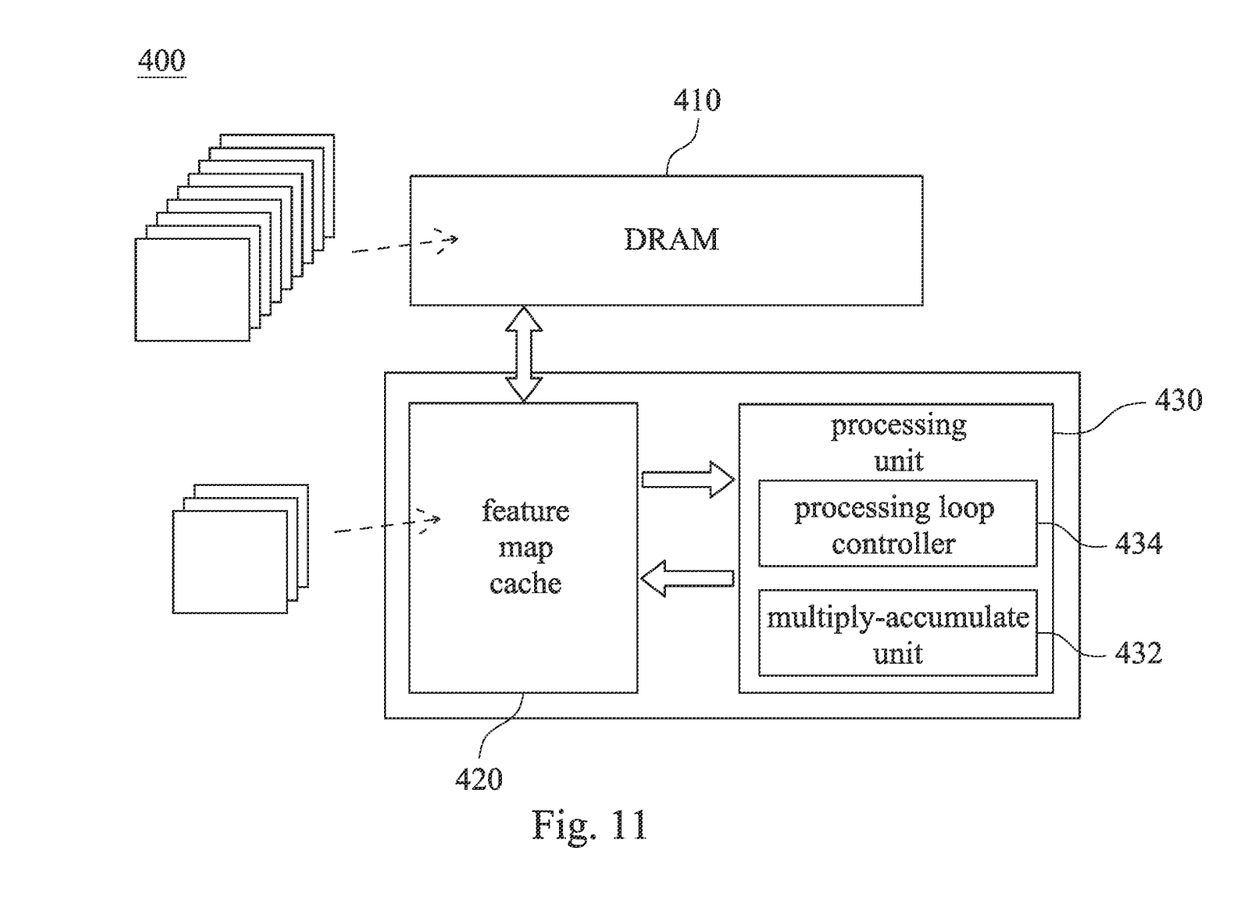
FIG. 11 shows a of a block diagram of a memory-adaptive processing system for a convolutional neural network according to a third embodiment of the present disclosure.

FIG. 11 shows a of a block diagram of a memory-adaptive processing system 400 for a convolutional neural network according to a third embodiment of the present disclosure. The memory-adaptive processing system 400 for the convolutional neural network may be applied with the memory-adaptive processing method 100 of FIG. 1 and the memory-adaptive processing method 100a of FIG. 6. The memory-adaptive processing system 400 for the convolutional neural network includes a dynamic random access memory 410 (DRAM), a feature map cache 420 and a processing unit 430.

The dynamic random access memory 410 is configured to store a plurality of input channels of an input feature map tile 200 and a plurality of output channels of an output feature map tile 300. The feature map cache 420 is connected to the dynamic random access memory. The feature map cache 420 is configured to store at least one of the input channels of the input feature map tile 200 and at least one of the output channels of the output feature map tile 300. The processing unit 430 is connected to the feature map cache 420. The processing unit 430 includes a multiply-accumulate unit 432 (MAC) and a processing loop controller 434 connected to the multiply-accumulate unit 432. The multiply-accumulate unit 432 is configured by the processing loop controller 434 to perform a convolutional layer operation with the input feature maps to produce the output feature maps according to a memory-adaptive processing technique. The input feature map tile 200 has a total input size (N×Si). The output feature map tile 300 has a total output size (M×So). The feature map cache 420 has a cache free space size. A size relation among a number N of a plurality of input channels of the input feature maps, an input feature map tile size, a number M of a plurality of output channels of the output feature maps, an output feature map tile size and the cache free space size of the feature map cache 420 is calculated by the processing loop controller 434. The memory-adaptive processing technique includes a transformation of a processing loop structure for the convolutional layer operation according to the size relation. Hence, the memory-adaptive processing system 400 of the present disclosure can reduce DRAM access so as to reduce power consumption.

Figure 12:
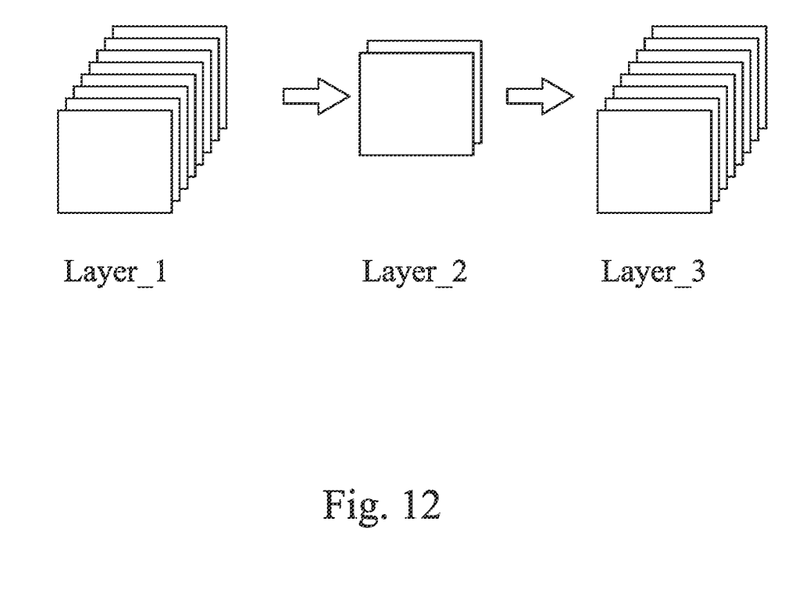
FIG. 12 shows a schematic view of a convolution calculating step of a memory-adaptive processing method for a convolutional neural network according to a fourth embodiment of the present disclosure.
Figure 13:
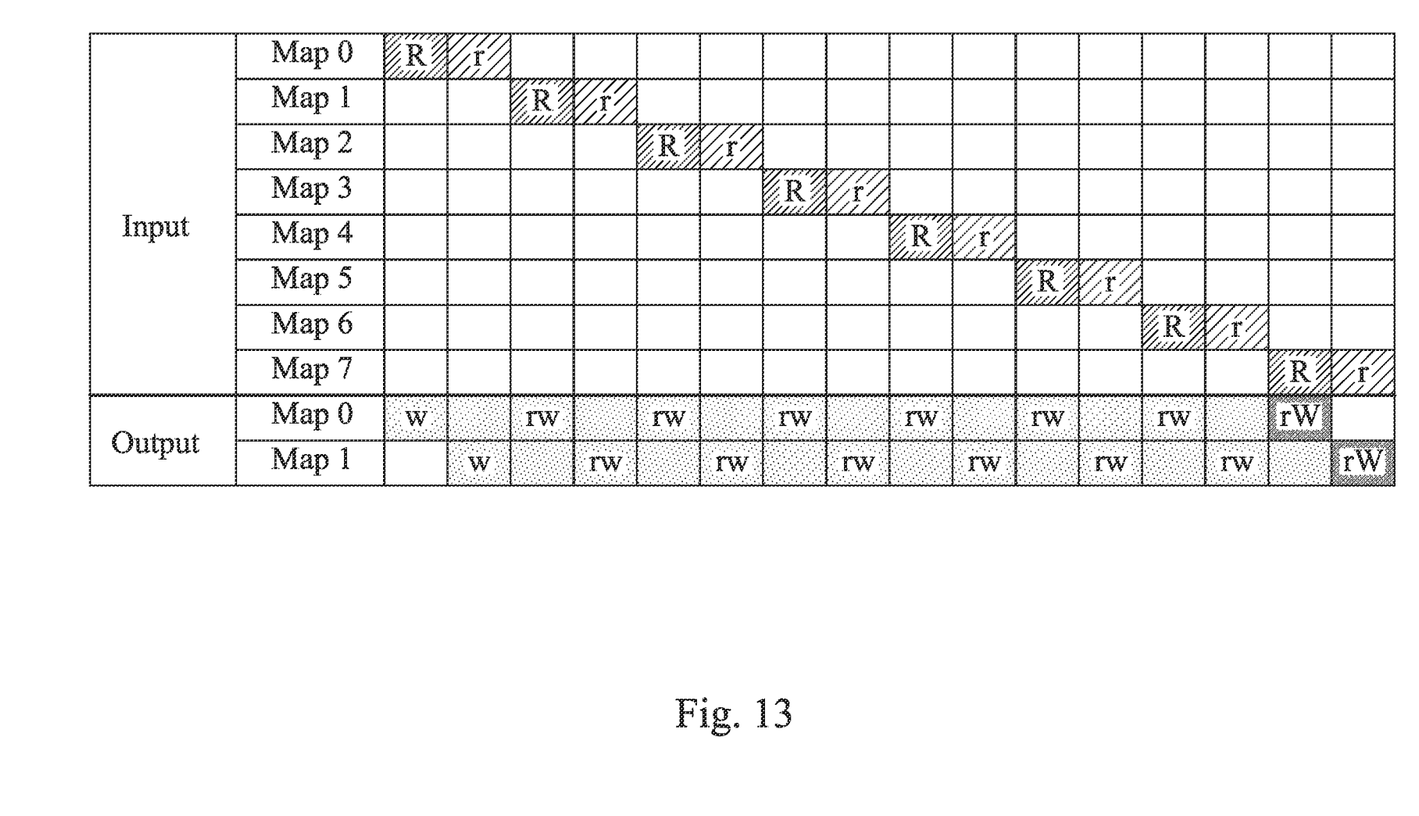
FIG. 13 shows a schematic view of a first example of the convolution calculating step of FIG. 12, which performs a convolutional layer operation by the input-layer-first processing.
Figure 14:
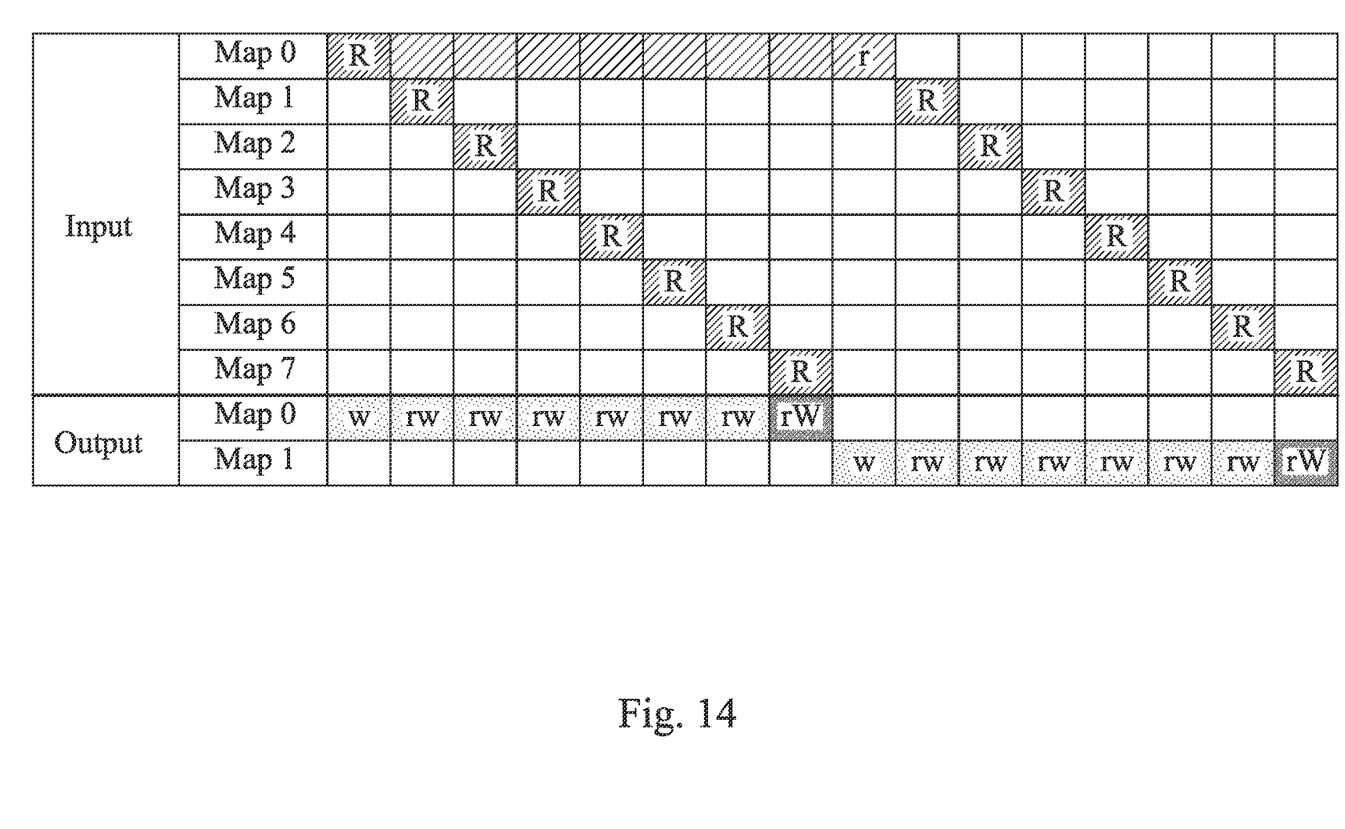
FIG. 14 shows a schematic view of a second example of the convolution calculating step of FIG. 12, which performs the convolutional layer operation by the output-layer-first processing.
Figure 15:
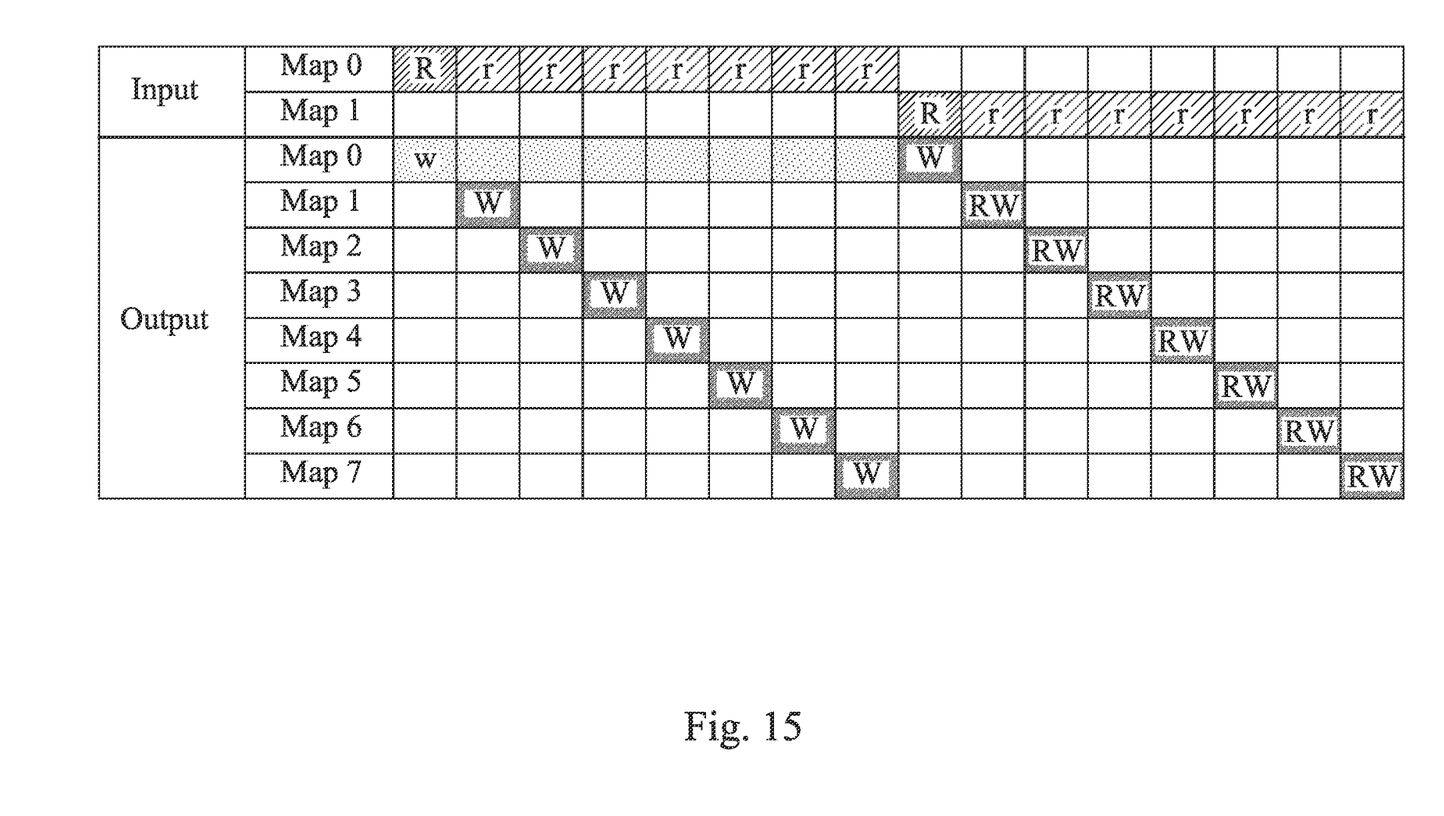
FIG. 15 shows a schematic view of a third example of the convolution calculating step of FIG. 12, which performs the convolutional layer operation by the input-layer-first processing.
Figure 16:
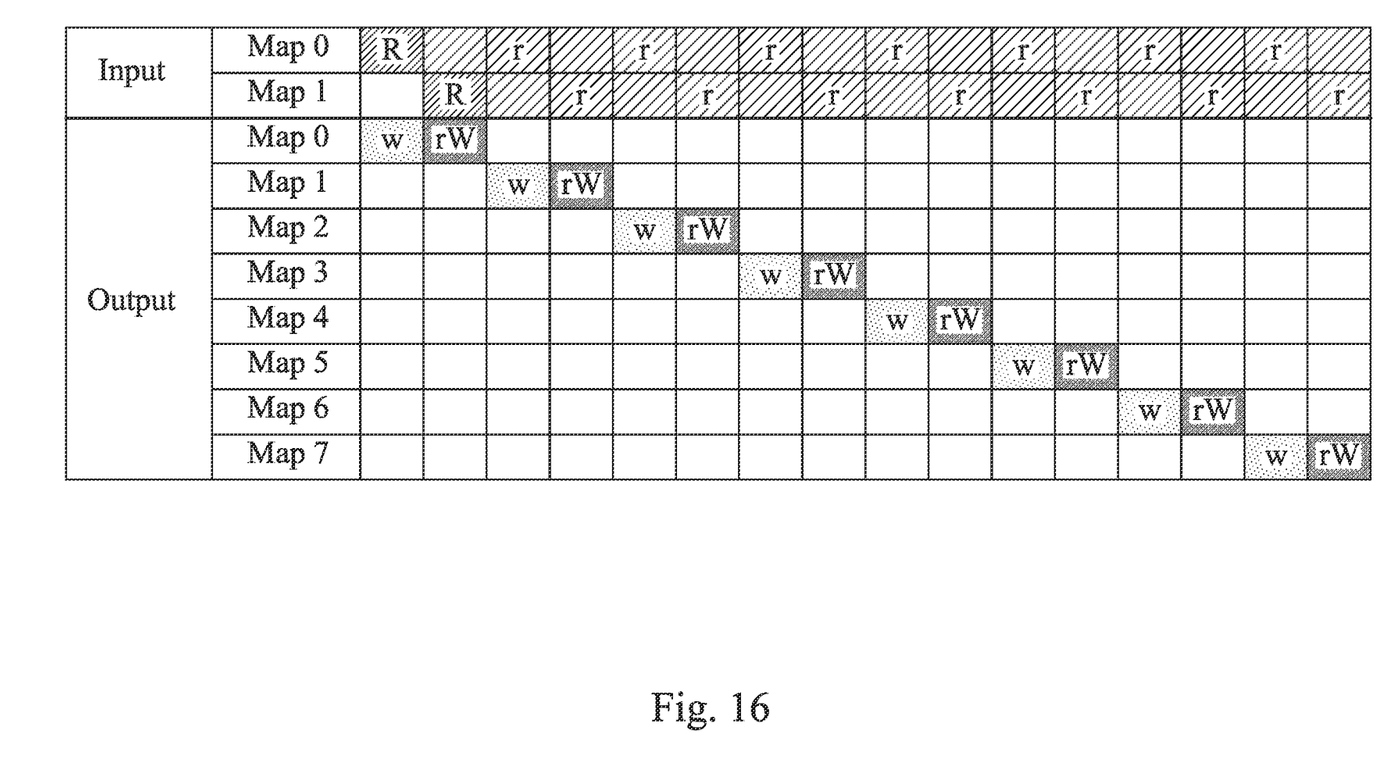
FIG. 16 shows a schematic view of a fourth example of the convolution calculating step of FIG. 12, which performs the convolutional layer operation by the output-layer-first processing.

FIG. 12 shows a schematic view of a convolution calculating step of a memory-adaptive processing method for a convolutional neural network according to a fourth embodiment of the present disclosure. FIG. 13 shows a schematic view of a first example of the convolution calculating step of FIG. 12, which performs a convolutional layer operation by the input-layer-first processing. FIG. 14 shows a schematic view of a second example of the convolution calculating step of FIG. 12, which performs the convolutional layer operation by the output-layer-first processing. FIG. 15 shows a schematic view of a third example of the convolution calculating step of FIG. 12, which performs the convolutional layer operation by the input-layer-first processing. FIG. 16 shows a schematic view of a fourth example of the convolution calculating step of FIG. 12, which performs the convolutional layer operation by the output-layer-first processing. The convolution calculating step of the memory-adaptive processing method for the convolutional neural network of FIG. 12 is used to process a non-aligned condition (unbalanced condition) of input channels and output channels. In FIGS. 13-16, the capacity of the feature map cache is three feature maps, and there are three layers Layer_1, Layer_2, Layer_3 to process two convolutional layer operations. One of the two convolutional layer operations is for processing eight feature maps of the layer Layer_1 to produce two feature maps of the layer Layer_2. Another one of the two convolutional layer operations is for processing the two feature maps of the layer Layer_2 to produce eight feature maps of the layer Layer_3.

In FIGS. 13 and 14, there are eight input channels and two output channels to process (i.e., N=8, M=2). In FIG. 13, there are 8R and 2W with the DRAM in the convolutional layer operation by using the input-layer-first processing. In FIG. 14, there are 15R and 2W with the DRAM in the convolutional layer operation by using the output-layer-first processing. The total output size (N×Si) is smaller than the cache free space size of the feature map cache, and all the output channels of the output feature map tile 300 are stored in the feature map cache. Therefore, the input-layer-first processing of the present disclosure having less DRAM access is suitable for the convolutional layer operation with the layer Layer_1 and the layer Layer_2.

In FIGS. 15 and 16, there are two input channels and eight output channels to process (i.e., N=2, M=8). In FIG. 15, there are 9R and 15W with the DRAM in the convolutional layer operation by using the input-layer-first processing. In FIG. 16, there are 2R and 8W with the DRAM in the convolutional layer operation by using the output-layer-first processing. Therefore, the output-layer-first processing of the present disclosure having less DRAM access is suitable for the convolutional layer operation with the layer Layer_2 and the layer Layer_3.

According to the aforementioned embodiments and examples, the advantages of the present disclosure are described as follows.

1. The memory-adaptive processing method and the memory-adaptive processing system of the present disclosure utilize the transformation of the processing loop structure for the convolutional layer operation according to the size relation so as to reduce DRAM access and power consumption.

2. The memory-adaptive processing method of the present disclosure utilizes the dividing step and the output-group-first processing step to reduce DRAM access so as to reduce power consumption.

3. When processing the non-aligned condition of input channels and output channels, the input-layer-first processing or the output-layer-first processing may be adaptively selected for the convolutional layer operation to reduce DRAM access and power consumption.

4. The strategy of the memory-adaptive processing method and the memory-adaptive processing system of the present disclosure can also be used in tile processing and fusion processing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A memory-adaptive processing method for a convolutional neural network, comprising:
    a feature map counting step, wherein the feature map counting step is for counting a number of a plurality of input channels of a plurality of input feature maps, an input feature map tile size, a number of a plurality of output channels of a plurality of output feature maps and an output feature map tile size for a convolutional layer operation of the convolutional neural network;
    a size relation counting step, wherein the size relation counting step is for obtaining a cache free space size in a feature map cache and counting a size relation among the number of the input channels of the input feature maps, the number of the output channels of the output feature maps, the input feature map tile size, the output feature map tile size and the cache free space size of the feature map cache; and
    a convolution calculating step, wherein the convolution calculating step is for performing the convolutional layer operation with the input feature maps to produce the output feature maps according to a memory-adaptive processing technique, and the memory-adaptive processing technique comprising:
        a dividing step, wherein the dividing step is for dividing the output channels into a plurality of output groups according to the size relation; and
        an output-group-first processing step, wherein the output-group-first processing step comprises a plurality of input-layer-first processing steps, and each of the input-layer-first processing steps is performed corresponding to each of the output groups.

2. The memory-adaptive processing method of claim 1, wherein each of the input-layer-first processing steps is for performing an input-layer-first processing, the input-layer-first processing represents that there is only one of the input channels of an input feature map tile in the feature map cache, the input feature map tile represents one tile of the input feature maps, there is at least one of the output channels of an output feature map tile of each of the output groups in the feature map cache, the output feature map tile represents one tile of the output feature maps, and the convolutional layer operation is performed in the processing loop structure with the input feature maps computing iterations as an outer loop and the output feature maps of each of the output groups computing iterations as an inner loop.

3. The memory-adaptive processing method of claim 1, wherein,
    the number of the input channels of the input feature maps is multiplied by the input feature map tile size to generate a total input size, the number of the output channels of the output feature maps is multiplied by the output feature map tile size to generate a total output size, and the total input size and the total output size are both greater than the cache free space size of the feature map cache.

4. The memory-adaptive processing method of claim 1, wherein the number of the output channels of the output feature maps is represented as M, the cache free space size of the feature map cache is represented as CFS, and a number of the output groups is represented as G and described as follows:

$$G = M/(CFS-1).$$

5. The memory-adaptive processing method of claim 1, wherein the number of the input channels of the input feature maps is represented as N, the number of the output channels of the output feature maps is represented as M, the cache free space size of the feature map cache is represented as CFS, and a number of the output groups is represented as G and described as follows:

$$G = M/(CFS-n),\ n<N,\ n<CFS;$$

wherein n represents a positive integer.

6. The memory-adaptive processing method of claim 1, wherein the number of the output channels of the output feature maps is represented as M, the cache free space size of the feature map cache is represented as CFS, and a number of the output groups is represented as G and described as follows:

$$G = M/CFS + n,\ 0 < n \leq M - M/CFS;$$

wherein n represents a positive integer.

* * * * *